Patented July 14, 1942

2,290,107

UNITED STATES PATENT OFFICE 2,290,107

VITREOUS HIGH ALUMINA PORCELAIN

Daniel W. Luks, Frenchtown, N. J., assignor to Frenchtown Porcelain Company, Trenton, N. J., a corporation of New Jersey No Drawing. Application December 6, 1938, Serial No. 244,303

4 Claims. (Cl. 106—46)

This invention relates to vitreous high alumina porcelains and has for its principal object to produce compositions of this character which can be vitrified at normal ceramic firing temperatures.

Porcelains containing high percentages of aluminum oxide present exceptional qualities of thermal conductivity, electrical resistance, thermal shock resistance, and mechanical strength, and for these reasons have been used in the past under conditions too severe for ordinary porcelains. The main difficulty in manufacturing porcelains of these types has been the abnormally high temperatures required to vitrify them. This is especially true when the alumina content reaches 90% or more of the formula. In fact, pure aluminum oxide vitrifies at about pyrometric cone 40, a temperature of some 2000° C.

Even with the additions of eutectic forming compounds and fluxes such as those of the alkaline earth group, the maturing temperature can hardly be brought below ceramic cone 18 unless very large percentages of the fluxes are used, in which cases the properties of the final porcelains are affected seriously, also they are prone to warp during firing.

I have developed a novel method of reducing the vitrification temperatures of high alumina porcelains and find that their properties are not seriously altered thereby. I find that by the addition of manganese salts or compounds to the high alumina bodies they can be vitrified into dense porcelains at ordinary ceramic firing temperatures, which are those indicated by pyrometric cones 9 to 18 inclusive.

When silica is present and the bond is mainly manganese aluminum silicate the maturing temperatures can be reduced as low as pyrometric cones 9-11, and with the silica absent and the bond as manganese aluminate excellent bodies are formed at pyrometric cones 14-16. The presence of some silica is advantageous since it can be supplied in the form of plastic clay which aids manufacturing processes and in larger percentages allows the development of mullite which offers better thermal shock resistance than aluminum oxide.

The high alumina porcelain batch to which the manganese compound is added may comprise any suitable mixture high in alumina content, for example any one or more of the following materials: bauxite, diaspore, corundum, minerals of the sillimanite group, clay and other aluminum silicates. Additions of up to 4% of one or a combination of more than one of the alkaline earths, beryllium oxide, magnesium oxide, zinc oxide, calcium oxide, strontium oxide, cadmium oxide and barium oxide may be made, which add impact resistance in all but the case of magnesia.

Under ordinary ceramic firing conditions any oxide of manganese, be it $MnO_2$, $Mn_3O_4$, or $MnO$, when it combines with the oxide of another element, does so in the form of the protoxide, $MnO$. For instance manganese spinel is $MnO \cdot Al_2O_3$. If $MnO_2$ were added to $Al_2O_3$, alumina, the half molecule of oxygen would be lost during the burning process.

The manganese oxide in these bodies has a two-fold purpose and reaction; that of catalysis, aiding the thorough recrystallization of the aluminum oxide as corundum, and secondly as a bond forming agent wherein the manganese dissolves and combines with some of the alumina and silica (if present) in the formula to cause vitrification. It is immaterial which reaction takes place first, or whether the catalysis can be identified with either the manganese oxide or the aluminates, silicates, or aluminum silicates of manganese. In any event the manganese is the vital element whether it catalyses as the oxide or in the form of another combination.

There is no preference as to how the manganese is added to the formulae. Any one or more of the oxides may be used, for example:

| | |
|---|---|
| $MnO_2$ | Pyrolusite |
| $Mn_2O_3$ | Braunite |
| $Mn_3O_4$ | Hausmannite |
| $MnO$ | Manganosite |

Or it may be added as the carbonate, silicate, aluminate, and aluminum silicate:

| | |
|---|---|
| $MnCO_3$ | Rhodochrosite |
| $MnO \cdot SiO_2$ | Rhodonite |
| $3MnO \cdot Al_2O_3 \cdot 3SiO_2$ | Spessartite |
| $MnO \cdot Al_2O_3$ | Galaxite |

And again in soluble form for certain processes of manufacture, as the chloride or the sulphate:

| | |
|---|---|
| $MnCl_2$ | Scacchite |
| $MnSO_4 \cdot H_2O$ | Szmikite |

These compounds are but examples and the list is not necessarily complete. The manganese can also be added as part of a calcine or component of a glass.

Silicon dioxide may be added in the form of flint, clay, aluminum silicates such as sillimanite, etc., manganese silicates, and in the cases where the alkaline earths are a part of the formula, it can be incorporated as silicates of these.

While the use of manganese oxide with clay is known in porcelains of low alumina content, my invention is readily distinguished therefrom:

Firstly, I am interested only in the high alumina field due to the excellent thermal conduction factor of porcelains from that area, and the higher the alumina content, the better.

Secondly, clays or similar materials are not necessary components; in fact, they tend to diminish some of the good properties afforded by the alumina. They are, however, an aid to manufacturing processes.

Thirdly, manganese supplied through one or more of its many compounds or salts brings about the recrystallization and bonding of alumina without clay, silicon dioxide, or any other material present.

Fourth, this recrystallization of alumina will not take place readily nor completely in the presence of silicon dioxide in porcelains containing less than 90% alumina, or thereabout, since below that zone a different mineral, mullite, tends to form. This mineral does not display the extremely high thermal conduction properties of recrystallized aluminum oxide.

Finally, my invention relates to the specific feature of bonding corundum by its own recrystallization and crystal growth in the presence of manganese oxide as a catalyst.

With regard to limits, inasmuch as mullite is the mineral almost always formed in aluminum silicate porcelains in the contemplation of this patent, any composition with more silica in it than mullite contains would be in the high silica field, and conversely any composition with more alumina in it than the mineral mullite contains would be in the high alumina field. Mullite contains

|  | Per cent |
|---|---|
| Aluminum oxide | 71.8 |
| Silicon dioxide | 28.2 |
| Total | 100 | which when incorporated with the optional figure of 30% manganese protoxide (MnO) totals

|  | Per cent |
|---|---|
| Aluminum oxide | 50.26 |
| Silicon dioxide | 19.74 |
| Manganese protoxide | 30.00 |
| Total | 100 |

With smaller percentages of manganese content the percentages of the other ingredients are larger, in the mullite proportion. Hence the mullite formula sets the maximum silicon dioxide at 28.2% whereas the maximum manganese content of 30% combined with the mullite formula sets the lower limit of aluminum oxide at 50.26%. The range of proportions of the high alumina field according to my invention therefore are

|  | Per cent |
|---|---|
| Aluminum oxide | 50.26 to 100.00 |
| Silicon dioxide | 28.20 to 0.00 |
| Manganese protoxide | 30.00 to 0.00 |

These, of course, are mathematical limits which are merely approached since while it is possible to reduce the silicon dioxide to zero, there must be an appreciable quantity of manganese content, which prevents reaching the theoretical upper limit of 100% aluminum oxide.

The manganese oxide has an effective range beginning with a trace and increasing substantially in proportion to the percentage up to 30%, beyond which it becomes excessive in decreasing the electrical resistivity for example, rendering the porcelain undesirable for certain uses.

Within these maximum ranges, for practical reasons I prefer the range of 4% to 15% manganese oxide, and from 85% to practically 100% aluminum oxide. It will be obvious that in high alumina porcelains according to my invention, so long as the alumina and manganese contents are within the maximum ranges given, the remainder of the porcelain composition may be made up of any of the various materials known to the art as suitable.

It is perfectly possible to carry out the recrystallization of alumina in the presence of manganese oxide without any silicon dioxide at all in the formula, and I have done so with good success. The coefficient of thermal conductivity is, of course, highest in this case. The main reason for the presence of clay which is a source of silicon dioxide in any body or mix is workability, but this factor can be supplied by organic colloids, gels, and other plastics.

Since manganese oxide melts at 1650° C. and aluminum oxide about 2050° C., and since there seems to be no precipitous eutectic between the two, there must be some reaction in the nature of a solid solution taking place between the two oxides which causes a mangan-alumina body to vitrify at my preferred firing temperature, namely 1400° C.

In proving my invention of the effect of manganese compounds in producing vitreous porcelains in the high alumina field at ordinary ceramic firing temperatures, I have made and tested a series of bodies of high alumina content with and without calcium oxide:

|  | Body No. | | | |
|---|---|---|---|---|
|  | 4398 | 4399 | 4400 | 4401 |
|  | Parts by weight | Parts by weight | Parts by weight | Parts by weight |
| Alumina | 90 | 85 | 85 | 80 |
| Manganese dioxide | 5 | 5 | 10 | 10 |
| Bone ash |  | 5 |  | 5 |
| Ball clay | 5 | 5 | 5 | 5 |
|  | 100 | 100 | 100 | 100 |

| Properties: |  |  |  |  |
|---|---|---|---|---|
| Mod. of rup., lbs. per sq. inch | 36,200 |  | 26,300 |  |
| Te value, temp. °F. at 1 megohm electrical resist | 1,310 |  | 1,345 |  |

| Resistance: |  |  |  |  |
|---|---|---|---|---|
| Temp. of complete failure, quenching from temp. indicated into water at 60° F. | 1,000° F | 1,000° F |  |  |
| Color: |  |  |  |  |
| Inside | Salmon | Dark br | Dark br | Very dark br. |
| Outside | Brown | do | Sal. br | Dark sal. br. |
| Underglaze | Light pink | Light pink |  |  |

No. 4398 and 4399 vitrify nicely at cone 15 down while No. 4400 and No. 4401 contain too much flux for that fire.

Microscopic examination of No. 4400 and No. 4401 showed fairly large crystals of corundum illustrating the catalyzing power of manganese dioxide in this respect. The bond between the alumina grains is no doubt a combination of manganese silicate, manganese aluminate, and manganese alumina silicate.

Two per cent additions of the alkaline earths calcium carbonate, barium carbonate, strontium carbonate, and magnesium carbonate to No. 4398 body added impact resistance in all but the case of magnesia, with calcium oxide the best. Magnesia produced a glassy structure and fracture, and changed the porcelain color from reddish brown to a dark tan.

The feature of impact resistance is borne out in test No. 4399 which has a noticeably stonier fracture than No. 4398 and with it more impact resistance.

A typical analysis of the ball clay used in the above tests is:

| | |
|---|---:|
| Silicon dioxide | 47.00 |
| Aluminum oxide | 30.18 |
| Iron oxide | 1.33 |
| Calcium oxide | .67 |
| Magnesium oxide | .37 |
| Potassium oxide | .32 |
| Sodium oxide | .77 |
| Combustibles | 18.73 |
| | 99.37 |

Summary

Mechanical strength

Dependent upon the type of crystal formed in the porcelains by the manganese oxide catalyst. Aluminum oxide best, mullite second best, etc.

Vitrification

This is controlled by the amount of manganese oxide present, which indicates the formation of manganese alumina silicates, manganese aluminates, and possibly manganese silicates.

Electrical resistance

Dependent upon the composition of the porcelain. High alumina best, high silica (mullite) next best, high manganese poor.

Firing range

Very long in certain areas of the chart. Indicates catalysis instead of progressive solution.

Thermal conductivity

Dependent upon the amount and type of crystal developed during firing. Aluminum oxide best, mullite and manganese compounds fair.

Heat shock resistance

Mullite best, alumina next, manganese compounds poor.

Thus the high alumina porcelain, according to my invention is dense, vitreous, and has high electrical resistance, very high transverse strength, high impact resistance, higher thermal shock resistance than sintered alumina or alkaline earth bonded alumina ware, high thermal conductivity, low vitrification temperature caused by strong catalysing powers and low temperature melt forming properties of manganese dioxide, and the property of taking glaze without biscuit firing of ware.

I claim:

1. A batch containing more than 50.26% of aluminum oxide, up to 30% of an oxide of manganese, from 2.5% to 28.2% silica, and up to 4% of at least one alkaline earth of the group consisting of the oxides of beryllium, magnesium, zinc, calcium, strontium, cadmium and barium.

2. A dense vitreous high alumina porcelain containing more than 50.26% of aluminum oxide, up to 30% of an oxide of manganese, and from 2.5% to 28.2% of silica, in which the content of aluminum oxide is in excess of 71.8% of the alumina-silica content, and the content of silica is less than 28.2% of said alumina-silica content, and up to 4% of at least one alkaline earth of the group consisting of the oxides of beryllium, magnesium, zinc, calcium, strontium, cadmium and barium.

3. A ceramic composition of matter containing more than 50.26% of aluminum oxide, up to 30% of an oxide of manganese, from 2.5% to 28.5% of silica, and up to 4% of an oxide of an alkaline earth, in which the content of aluminum oxide is in excess of the ratio 71.8:28.2 to the content of silica, and having an initial vitrification temperature between pyrometric cones 9 to 18 inclusive.

4. A ceramic composition of matter containing more than 50.26% of aluminum oxide, up to 30% of an oxide of manganese, from 2.5% to 28.2% silica, and up to 4% of at least one alkaline earth of the group consisting of the oxides of beryllium, magnesium, zinc, calcium, strontium, cadmium and barium.

DANIEL W. LUKS.